United States Patent

[11] 3,559,748

| [72] | Inventor | Lee E. Shelton<br>Chicago, Ill. |
|---|---|---|
| [21] | Appl. No. | 745,765 |
| [22] | Filed | July 18, 1968 |
| [45] | Patented | Feb. 2, 1971 |
| [73] | Assignee | Borg-Warner Corporation<br>Chicago, Ill.<br>a corporation of Delaware |

[54] FLUTED COULTER DISC BLADE
2 Claims, 5 Drawing Figs.

[52] U.S. Cl. .................................................. 172/604
[51] Int. Cl. .................................................. A01b 23/06
[50] Field of Search ........................................ 172/604,
555, 548, 518, 540; D39/2; 111/87

[56] References Cited
UNITED STATES PATENTS

| 9,169 | 4/1880 | Johson | 172/604X |
| 323,343 | 7/1885 | La Dow | 172/604X |
| 323,344 | 7/1885 | La Dow | 172/604X |
| 871,358 | 11/1907 | Peck | 172/555X |
| 1,195,710 | 8/1916 | Nichols | 172/555X |
| 3,122,111 | 2/1964 | Taylor | 172/604X |
| 3,351,139 | 11/1967 | Schmitz et al. | 172/518X |

FOREIGN PATENTS

| 76,416 | 5/1919 | Austria | 172/604 |
| 63,021 | 6/1892 | Germany | 172/555 |

*Primary Examiner*—Robert E. Pulfrey
*Assistant Examiner*—Alan E. Kopecki
*Attorney*—Donald W. Banner

ABSTRACT: A fluted coulter disc blade having a fluted peripheral portion with a diminished thickness peripheral portion outwardly of the flutes to provide a substantially circular and straight cutting edge.

PATENTED FEB 2 1971
3,559,748
FIG. 1
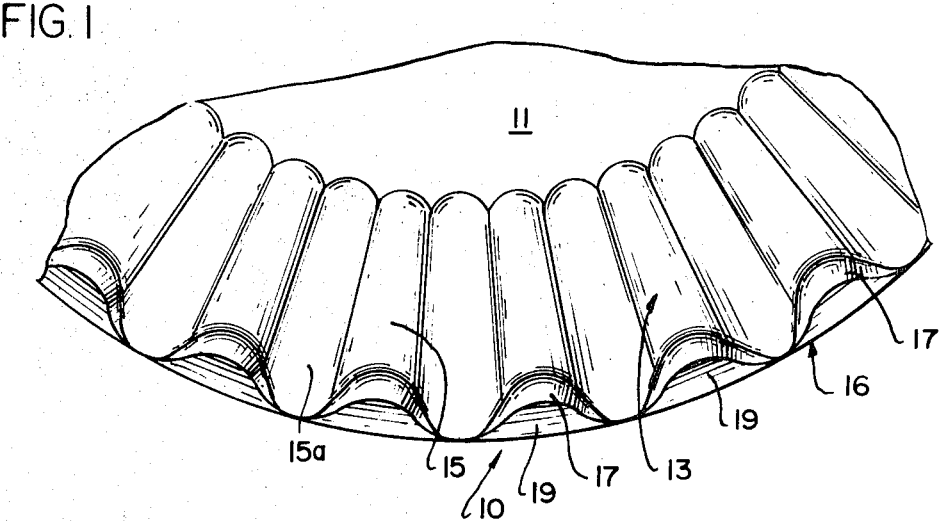
FIG. 3
FIG. 2
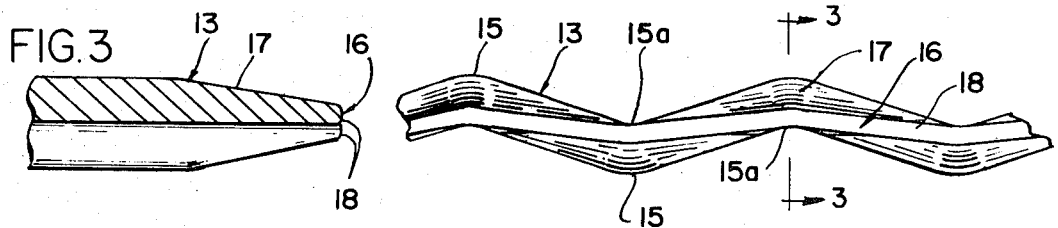
FIG. 5
FIG. 4
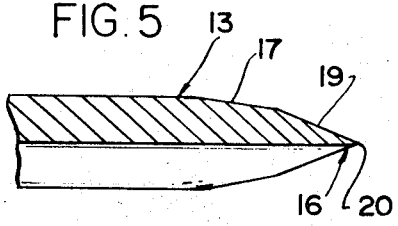
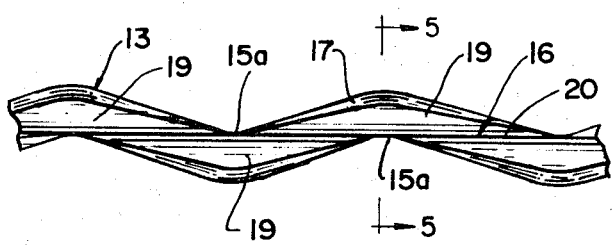
INVENTOR
LEE E. SHELTON
BY Evan D Roberts
ATTORNEY.

FLUTED COULTER DISC BLADE

SUMMARY OF THE INVENTION

This invention provides an improved coulter disc blade and method for making same wherein said blade comprises a circular blade having radially extending and axially alternately offset extending inwardly from the peripheral edge portion of the blade, thereby providing radially extending and axially alternating raised portions extending inwardly from the edge portion. The outer ends of the raised portions are gradually diminished in thickness radially outwardly to the edge portion. The gradually diminished portions can be further diminished by removing metal therefrom. The resultant cutting edge is substantially straight in side view and circular in plan view.

Existing types of coulter blades provide various structures. However, one which may be considered the most desirable includes circumferentially positioned uniform flutes that extend radially in the periphery of a disc. This structure provides a corrugated axially alternating cutting edge around the periphery of the disc. The corrugations provide a means whereby the disc will react with the earth to rotate with the earth as it is moved into engagement therewith. The reaction and the abrasive action of the wider portions with the earth provide a self-cleaning and self-sharpening result on the blade. However, the corrugated cutting edge provides a cutting edge substantially greater than a simple straight peripheral cutting edge would provide, and accordingly, it tends to require a proportionately greater force to bring about the entry of the disc into the earth than that which would be required with a simple circular peripheral cutting edge. Unfortunately, the existing fluted coulter blade discs and the several appropriate variations thereof require expensive and complicated manufacturing methods for any structural elaboration, and the flat coulter blade disc with a simple circular cutting edge does not provide the appropriate traction with respect to the earth to bring about the appropriate rotation of the disc to facilitate entry into the earth and to provide the desirable self-cleaning and self-sharpening functions obtained by the fluted cutting edge.

It is, therefore, highly desirable to provide a fluted coulter disc blade in an improved form whereby a substantially circular cutting edge is provided along with flutes extending outwardly substantially to the peripheral cutting edge to provide the highly desirable traction for the blade with the earth as well as the desirable self-cleaning and self-sharpening characteristics. Also, it is similarly desirable to provide an improved method of manufacture by which such an improved coulter disc blade is produced in an appropriately simple and efficient manner. Accordingly, the present invention, as summarized above, provides an improved and unique structure which in turn provides the desirable functional results heretofore unobtainable.

Other advantages and novel aspects of the invention will become apparent upon the following detailed description, in conjunction with the accompanying drawing wherein:

FIG. 1 is a partial plan view of the improved coulter blade of this invention showing the details of the shape of fluted peripheral portions having both a diminished and a tapered portion;

FIG. 2 is a partial radial edge view of the improved coulter blade of this invention showing a substantially circular peripheral portion with radially outwardly diminished flutes without material being removed therefrom;

FIG. 3 is a partial sectional view taken along line 3–3 of FIG. 2 showing the general radially outwardly diminished shape of the flutes without material removed therefrom;

FIG. 4 is a partial radial edge view of the improved coulter blade of this invention as illustrated in FIG. 1 showing the tapered flutes with material removed adjacent the periphery thereof and having a circular peripheral cutting edge; and FIG. 5 is a partial sectional view taken along line 5–5 of FIG. 4 showing the general shape of the flutes with the radially outwardly diminished portions with material removed adjacent the periphery thereof and having a circular peripheral cutting edge section through FIG. 1 will show the same configuration;

An improved coulter disc blade is shown herein for the purpose of illustrating the invention, and is generally designated by the numeral 10. Although the improved disc 10 of this invention is illustrated herein by a generally flat structure for purposes of clarity, it is to be understood that the invention could apply to a dished or otherwise concavo-convex structure without deviating from the scope thereof. The disc 10 is generally provided with a disc body 11, a center opening and a fluted peripheral portion 13.

The center is provided so that the disc 10 can be rotatably mounted in a conventional manner on an arm or beam of a plow or similar piece of ground working equipment (not shown), generally in a position in advance of a plow share thereof (not shown), to open the ground for the plow share.

The fluted peripheral portion 13 is provided with a series of circumferentially positioned and alternately offset raised portions 15 which extend radially inwardly from a cutting edge generally designated by the numeral 16. The raised portions 15 are each formed with a gradually radially, outwardly diminished portion 17 in an outer peripheral portion 15 which provides a substantially straight edge 18. The outermost portion of the diminished portion 17 also may have the material removed therefrom at an acute angle along a surface 19 to provide a circular cutting edge 20.

Although the fluted portion 13 illustrated herein specifically disclose the radially outwardly diminishing configuration 17 in the radially outer portion of the raised portions 15 only, the diminished portion 17 could nevertheless extend from the inner most maximum axial dimension substantially to the peripheral edge 16. However, the inventor has found by actual usage that the configuration disclosed herein provides the most efficient reaction with the ground surface to most appropriately open the ground and provide the self-cleaning and self-sharpening characteristics which are so highly desirable in a coulter disc.

The improved coulter disc blade of this invention can be provided with raised portions which are either gradually outwardly diminished and with material removed at the outermost portion thereof to provide a circular cutting edge; or which are only radially outwardly diminished to provide a substantially circular cutting edge. Thus, two modifications are provided by the present invention; however, the most desirable configuration is the one wherein the raised portions are both radially outwardly diminished and wherein the material is removed from the outermost portion to provide a circular cutting edge.

It is to be particularly noted that the diminishing configuration in the outer portion of the raised portions provides a substantially circular cutting edge with a nominal alternating deviation and which lies within the axial dimensions defined by adjacent concave portions 15a of the axially alternated raised portions.

In other words the disc 10 is deformed such that a plane or planar surface passing through the edge passes through the bottom or concave portions 15a of all the flutes. It can be clearly seen from the drawings, specifically FIGS. 2 and 4, that the bottom or concave portion 15a is located in a plane passing through the disc 10 parallel to one or both surfaces thereof. In the case of a dished disc, the bottom of any flute is within a spherical surface passing through the disc.

I claim:

1. An improved coulter blade comprising a plate having radially extending and axially alternating flutes extending inwardly from the peripheral edge portion of the plate, thereby providing radially extending and axially alternating raised portions extending inwardly from said edge portion, at least the outer ends of said raised portions being gradually diminished in thickness radially outwardly to said edge portion, said edge portion being substantially straight in side view and circular in plan view.

2. An improved coulter blade as defined in claim 1 in which said diminished thickness portions have material removed therefrom closely adjacent said edge portion.